2,778,989
Patented Jan. 22, 1957

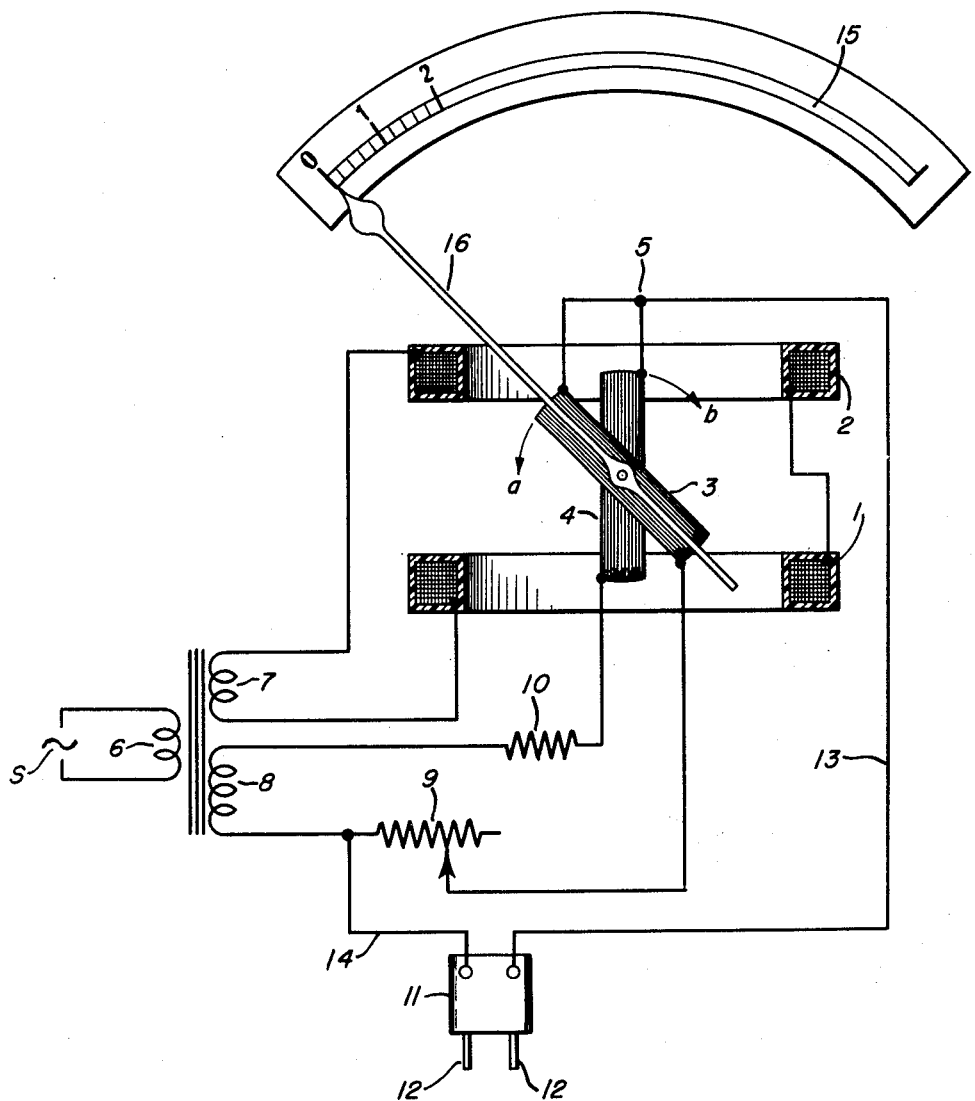

2,778,989

DYNAMOMETER INSTRUMENT

John H. Miller, Short Hills, N. J., assignor to Weston Electrical Instrument Corporation, Newark, N. J., a corporation of New Jersey Application January 30, 1953, Serial No. 334,179

3 Claims. (Cl. 324—30)

This invention relates to an electrical instrument and more particularly to an electrodynamometer instrument of the ratio meter class.

While my invention is of general utility in the field of measurement and/or indication of the ratio of two electrical currents corresponding to variable conditions such as temperature, power factor, etc., the accompanying description is limited to an arrangement for measuring the salinity of water.

Salinity meters are employed upon ships to check the boiler feed water system and other fresh water lines for contamination by sea water. Electrical apparatus for measuring salinity is especially convenient as electrolytic cells may be installed, either permanently or temporarily, at different points in the water system, and the salinity of the water at any one cell may be measured substantially instantaneously in terms of its conductivity. The conductivity of water increases as a function of the salt content, and it is substantially zero for fresh water. The moving systems of instruments employed in prior types of electrical apparatus for the measurement of salinity have been of limited angular deflection with correspondingly short scales which were difficult to read accurately, or they included three serially connected coils and were, therefore, relatively heavy, of relatively high resistance and of low efficiency.

An object of this invention is the provision of an electrodynamometer instrument of the ratio meter class and wherein the movable system consists of two, wire-wound coils secured together at an acute angle resulting in a movable system of low resistance and weight and yet rotatable over a large angular displacement.

An object of this invention is the provision of an electrodynamometer ratio meter in which the movable system comprises two coils arranged at an acute angle to each other and connected serially to a source of alternating current to develop torques in opposite sense.

An object of this invention is the provision of a salinity meter of the electrodynamometer type in which the movable system comprises two, wire-wound coils arranged at an acute angle to each other and serially connected to a source of alternating current to develop torques in opposite sense, and in which an electrolytic cell is shunted across one coil in such manner that the currents in the respective coils vary in opposite sense with changes in the salinity of the water in the cell.

These and other objects and the advantages of the invention will be apparent from the following specification when taken with the accompanying drawing in which the single view is a schematic diagram of electrical apparatus according to the invention for measuring salinity.

The measuring instrument of the salinity meter is an alternating current ratio meter of the electrodynamometer type having field windings 1 and 2 which are connected in series, and a movable system comprising the two pivotally mounted coils 3 and 4 which are rigidly connected at an acute angle to each other. The coils are serially connected at point 5, and are wound or connected in opposite sense to develop torques in opposite sense in response to current flow therethrough, the coil 3 tending to turn counterclockwise while the coil 4 tends to turn clockwise, as indicated by the arrows $a$ and $b$, respectively.

The instrument is energized from an alternating current source S through a transformer having a primary winding 6 connected across the source, a secondary winding 7 to which the field windings 1, 2 are connected, and another secondary winding 8 for energizing the movable system. The outer terminal of coil 3 is connected to the winding 8 through an adjustable temperature compensating resistance 9, and the outer terminal of coil 4 is connected to the other end of the winding 8 through a voltage-dropping resistor 10. The measuring circuit is completed by the electrolytic cell 11, comprising a pair of spaced electrodes 12, which is shunted across the coil 3 and resistance 9 by a lead 13 which extends to the junction 5 of the coils 3, 4 and a lead 14 which is connected to the transformer end of the resistance 9.

The instrument may be provided with a graduated scale 15 and the movable system includes a pointer 16 which is displaced along the scale in accordance with the magnitude of the opposing torques developed by the coils 3 and 4. Coil 3 has a greater number of turns than coil 4 and, in one practical embodiment of the invention in which coil 4 was displaced from coil 3 by 45°, the coil 3 had 2 N turns and the coil 4 had 1.41 N turns. The coil 4, in this embodiment, is the functional equivalent of two coils of N turns each, according to the prior three-coil practice, in which one coil of N turns was normal to the other coils. The described two-coil construction has the advantages of mechanical simplicity and of reductions in both weight and resistance as compared with the prior three-coil type of moving system. This embodiment of the invention was more efficient than the prior apparatus by some 30% in view of these reductions in the weight and the resistance of the moving system.

In use of the apparatus, the electrolytic cell 11 is introduced into the fresh water system of the ship at the point which is to be checked for contamination by salt water, and the transformer is plugged into the available alternating current source. If the water under test is free from contamination by salt, the cell 11 will be substantially non-conductive and the same current will be established in coils 3 and 4 by the winding 8 of the transformer. The moving system will turn counterclockwise to aline the pointer 16 with the zero graduation of the scale 15, since the coil 3 has a greater number of turns than the coil 4 and therefore develops the greater torque. If the water contains salt, however, the electrolytic cell 11 will be conductive in some degree and the current through the coil 4 increases but a part of the coil 4 current will be diverted from the coil 3 to flow through the cell, thereby reducing the torque of the coil 3 and increasing the torque of the coil 4. The coil 3 current is further reduced, in addition to the diversion through the cell 11, since the increased current through the series resistance 10 develops a greater voltage drop across the resistance which reduces the potential across the coil 3. Increases in the salinity of the water under test, therefore, increases the torque of the coil 4 while reducing the torque of the coil 3, and the moving system turns clockwise to displace the pointer 16 over the scale 15 in accordance with the salinity of the water under test.

The scale 15 may be graduated in appropriate absolute values of percentage or of grams of salt per gallon to afford an indication of the magnitude of the leakage of salt water into the fresh water system but, in general, the primary purpose of the apparatus is to determine whether or not there is any leakage and arbitrary scale graduations may be sufficient.

The conductivity of salty water increases not only with the salt content but with temperature and, when the scale 15 is graduated in absolute values, the adjustable resistance 9 constitutes means for regulating the current through the coil 3 to compensate for variations in the conductivity of the cell 11 which are due to temperature changes and not to variations in the salinity of the water.

It is to be understood that the invention is not limited to the specific embodiment herein described as the inclination of the two coils of the moving system of the instrument, and the relative number of turns of the coils, may be varied without departure from the spirit and scope of the invention as set forth in the following claims.

I claim:

1. In a salinity indicating instrument of the type comprising a field winding adapted to be energized from an alternating current source to produce a magnetic flux field, a scale calibrated in terms related to salinity, a movable system pivotally supported for angular movement in the magnetic flux field and carrying a pointer deflectable over the scale said movable system comprising a plurality of wire wound coils and arranged for series energization from said source, and an electrolytic cell shunted across one of the said coils; the improvement wherein the movable system consists of two coils disposed at an angle of 45 degrees and wherein the number of turns of the coil shunted by the cell is 1.41 times the number of turns of the other coil.

2. In a salinity meter of the type for measuring the salinity of water and comprising a field winding for establishing a magnetic field; a circuit for energizing the field winding from a source of alternating current potential; a scale calibrated in terms of salinity; a movable system pivotally supported for angular movement in the magnetic field and carrying a pointer; the improvement wherein the movable system comprises a first and second coil, which coils are disposed at an acute angle to each other, the first said coil having a greater number of coil turns than the said second coil; a circuit for energizating the said coils serially from a source of alternating current potential to develop torques in the opposite sense in the said first and second coils; an electrolytic cell shunted across the said first coil and adapted to be positioned in the water being tested, which cell is substantially non-conductive with zero salinity of the water and becomes increasingly conductive with increasing salinity thereof; and the said pointer assuming one scale extreme position upon energization of the said field winding and first and second coils when the said electrolytic cell is substantially non-conductive, the deflection of the pointer from the said one scale extreme position increasing with increased salinity of the said water being tested.

3. The invention as recited in claim 2 wherein the said first and second coils are disposed at an angle of 45 degrees and wherein the turns ratio of the said first and said second coil is 2 to 1.41.

References Cited in the file of this patent

UNITED STATES PATENTS

| | | |
|---|---|---|
| 2,097,036 | Mori | Oct. 26, 1937 |
| 2,150,015 | Witham | Mar. 7, 1939 |
| 2,306,691 | Ellis | Dec. 29, 1942 |
| 2,606,230 | Perry | Aug. 5, 1952 |

FOREIGN PATENTS

| | | |
|---|---|---|
| 628,614 | France | Oct. 26, 1927 |